(12) United States Patent
Shintani et al.

(10) Patent No.: US 7,933,179 B2
(45) Date of Patent: Apr. 26, 2011

(54) OPTICAL INFORMATION REPRODUCING METHOD, OPTICAL INFORMATION REPRODUCING DEVICE, AND OPTICAL INFORMATION RECORDING MEDIUM

(75) Inventors: Toshimichi Shintani, Kodaira (JP); Hiroyuki Minemura, Kokubunji (JP); Soichiro Eto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 12/102,909

(22) Filed: Apr. 15, 2008

(65) Prior Publication Data
US 2009/0080311 A1    Mar. 26, 2009

(30) Foreign Application Priority Data

Sep. 20, 2007 (JP) ................................. 2007-243221

(51) Int. Cl.
*G11B 5/00* (2006.01)
(52) U.S. Cl. ................. 369/47.5; 369/272.1; 369/47.53; 369/53.2; 369/53.22; 369/53.26; 369/53.27; 369/116
(58) Field of Classification Search .................. 369/47.5, 369/272.1, 47.53, 53.2, 53.22, 53.26, 53.27, 369/116
See application file for complete search history.

(56) References Cited

U.S. PATENT DOCUMENTS

| | | | |
|---|---|---|---|
| 6,430,128 B1 | 8/2002 | Kato et al. | |
| 6,538,968 B1 * | 3/2003 | Yamaguchi et al. | 369/47.53 |
| 6,584,050 B1 * | 6/2003 | Okumura et al. | 369/47.5 |
| 6,771,576 B2 * | 8/2004 | Okumura et al. | 369/47.25 |
| 2002/0191527 A1 | 12/2002 | Kikukawa et al. | |
| 2006/0072434 A1 | 4/2006 | Shintani et al. | |
| 2007/0140083 A1 | 6/2007 | Bae et al. | |
| 2007/0247988 A1 * | 10/2007 | Kikukawa et al. | 369/47.5 |
| 2008/0285431 A1 * | 11/2008 | Minemura et al. | 369/284 |

FOREIGN PATENT DOCUMENTS

EP    1 884 939    2/2008

(Continued)

OTHER PUBLICATIONS

Shinoda, et al., "High-Density Near-Field Readout over 50 GB Capacity Using Solid Immersion Lens with High Refractive Index", Japanese Journal of Applied Physics, vol. 42, pp. 1101-1104, Nov. 25, 2002.

Yasuda, et al., "Premasterec Optical Disk by Superresolution", Japanese Journal of Applied Physics, vol. 32, pp. 5210-5213, Aug. 21, 1993.

(Continued)

*Primary Examiner* — Wayne R Young
*Assistant Examiner* — Brenda Bernardi
(74) *Attorney, Agent, or Firm* — Antonelli, Terry, Stout & Kraus, LLP.

(57) ABSTRACT

In a super-resolution optical disk for the purpose of achieving an increase in the density of recording data by reproducing a recording mark smaller than optical resolution, the optimum reproduction power needs to be determined since the quality of a super-resolution reproduced signal strongly depends on the reproduction laser power. However, since the track error signal required for tracking servo also depends on the reproduction power, there is a need for a method for determining the reproduction power taking into account both the stabilization of tracking servo and a quality improvement of the reproduction signal. The reproduction power is changed under conditions with focusing servo applied but without application of tracking servo. Thereby, a cross track signal is detected to identify a reproduction power region that leads to quality improvement of both a reproduction signal and a track error signal.

12 Claims, 3 Drawing Sheets

FOREIGN PATENT DOCUMENTS

| | | |
|---|---|---|
| JP | 8-96412 | 4/1996 |
| JP | 2003-323723 | 11/2003 |
| JP | 2006-107588 | 4/2006 |
| JP | 2006-209898 | 8/2006 |
| JP | 2006209898 A * | 8/2006 |
| WO | WO 2005/052928 | 6/2005 |
| WO | WO 2005/064601 | 7/2005 |

OTHER PUBLICATIONS

Shintani, et al., "Sub-Terabyte-Data-Capacity Optical Discs Realized by Three-Dimensional Pit Selection", Japanese Journal of Applied Physics, vol. 45, pp. 2593-2597, Apr. 7, 2006.

Anzai, et al., "Fabrication of Discs for Three-Dimensional Pit Selection Using Damascene Process", Japanese Journal of Applied Physics, vol. 42, pp. 1101-1104, Jun. 22, 2007.

* cited by examiner

OPTICAL INFORMATION REPRODUCING METHOD, OPTICAL INFORMATION REPRODUCING DEVICE, AND OPTICAL INFORMATION RECORDING MEDIUM

CLAIM OF PRIORITY

The present application claims priority from Japanese application JP 2007-243221 filed on Sep. 20, 2007, the content of which is hereby incorporated by reference into this application.

BACKGROUND OF THE INVENTION

1. Field of the Invention

The present invention relates to high-capacity optical disc techniques, and more particularly to a reproduction method for determining an optimum light power to reproduce information recorded on a high-capacity optical disc, a reproduction device that determines an optimum light power to reproduce information, and further an information recording medium in which an optimum light power is recorded.

2. Description of the Related Art

Up to now, as the large capacity information recording technology, high density optical recording techniques has been studied and developed to allow more information to be stored in a unit area. In the technique of optical discs currently commercialized, a laser beam is focused on a disc surface to record and/or reproduce data recorded on the disc. In order to increase the density of data, a technique for making the size of a focused laser spot smaller has been developed so far. It is known that the spot size is proportional to $\lambda/NA$, where $\lambda$ and NA denotes the wavelength of a light source and the numerical aperture of an objective lens, respectively. That is to say, the amount of information stored in one disc has been increased by shortening the wavelength of a light source and increasing NA of a lens. Here, if a set of the wavelength of a light source, NA of an objective lens, and the capacity of data stored in a disc of a 12 cm diameter is denoted as (wavelength, NA, capacity), then it is (780 nm, 0.5, 650 MB) in CD and (650 nm, 0.6, 4.7 GB) in DVD. Moreover, two kinds of sets (405 nm, 0.85, 25 GB) and (405 nm, 0.65, 20 GB) have been proposed for the techniques using a blue laser light source. With this storage capacity, it is possible to record high definition TV image data for about two hours.

However, the above-described storage capacity is insufficient, for instance, for use in business systems, such as broadcasting stations, and in security systems, where, for instance, one disc is required to have a capacity of no less than 100 GB. Moreover, there is a demand for a disc for storing image data or the like desired to be stored for a long period of time as long as several tens of years to about 100 years. In this case, a single disc is desired to store as much data as possible in order to save the storage place for media storing such a great amount of data. The required capacity is from several hundred GB to 1 TB or more.

However, achieving a further increase in the capacity using the above-described method is difficult. First of all, it is extremely difficult to develop a semiconductor laser as a light source with a further shorter wavelength. Moreover, even if a laser diode were developed, securing excellent record/reproduction quality is expected to be difficult since the disc substrate and protective film would absorb light because the light source emits ultraviolet light. Research on increasing NA of an objective lens is currently underway, and a technique in the case where NA is set to 1.8 is reported in Japanese Journal of Applied Physics, Vol. 42, pp. 1101-1104, for example. However, in this system, the light used in recording/reproducing is not a regular propagating light but a so-called near-field light, which is a light localized at the lens, so that the system needs to have a mechanism of moving a lens above a disc while bringing the lens extremely close to the disc surface and maintaining the distance between them. Such system is similar to a hard disk technology for magnetic recording, and thus has a disadvantage of the difficulty of replacing discs, which is an advantage of the optical disc.

According to the background described above, a method for effectively improving the optical resolution by providing some mechanism in a disc has been proposed. Here, this method will be referred to as a super-resolution technique.

A super-resolution technique using a phase change recording film is reported in Japanese Journal of Applied Physics, Vol. 32, pp. 5210-5213. The phase change recording film is typically used as a recording film for a rewritable disc such as CD-RW, DVD-RAM, DVD±RW, and a Blu-ray Disc, or the like. However, here, this recording material is not used as the recording film but used as a layer to effectively improve the optical resolution like the reproducing layer in the above-described optical magnetic disc. Herein, such layer (film) will be referred to as a super-resolution layer (film). In this case, the data recorded on the disc is recorded not on the here-termed super-resolution layer, but on another place. For example, in the case of a read-only (ROM) disc, the data is recorded in the form of concavity or convexity on the substrate, and in the case of a recordable-type disc, a recording film is provided in addition to the here-termed super-resolution layer, and the data will be recorded on this recording film. As a typical example of this technique, the super-resolution layer and a layer on which data is recorded are provided in a similar fashion within the depth of focus of a beam to be irradiated, where the interlayer distance is several tens to several hundreds nm. In this technique, the phase change recording film is deposited on a read-only (ROM) disc by sputtering and a part of the phase change recording film is melted during reproduction. If the reflectivity of the disc at the melted portion is sufficiently high, the signal obtained from the melted portion becomes dominant in the reproduction signals. That is, the melted portion of the phase change film serves as the effective reproducing light spot. This means that the reproducing light spot has been reduced because the area of the melted portion is smaller than the light spot, so that the optical resolution is improved.

Japanese Patent Application Publication No. 2006-107588 has further developed this approach and proposed a method, in which pits made of a phase change material is prepared and then a single pit is melted during reproduction to thereby obtain a super-resolution effect. In this proposal, the pits are made of a phase change material by using a phase change etching technique. The phase change etching technique is a technique of transforming the patterns of phase change marks into concaves and convexities by utilizing a difference in solubility to an alkaline solution between the crystalline part and amorphous part of the phase change film. In this technique, since a material exhibiting the super-resolution effect is present only in the mark portion, the space portion does not absorb light at all. Accordingly, the optical transmissivity of one layer can be improved to allow for a combination of the multilayer technique and the super-resolution technique. An example achieving a dual-layer super-resolution disc with this technique is reported in Japanese Journal of Applied Physics, Vol. 45, pp. 2593-2597. This method will be referred to as a pit type super-resolution scheme, and the case where a super-resolution thin film is successively deposited in two dimensions as described above will be referred to as a thin film type super-resolution scheme.

Furthermore, a method for suppressing a normal-resolution crosstalk, which is a problem common to super-resolution techniques, using the pit type super-resolution scheme described above may be contemplated. The normal-resolution crosstalk is described below. Usually, in the super-resolution scheme, as described above, the optical resolution is improved using a high temperature area formed near the center of a light spot as the effective spot. In this case, actually, a low temperature area is also irradiated with light, so that a light signal reflected at the medium and entering a photo detector includes also an influence from recording marks existing within the low temperature area. In the super-resolution scheme, the desirable signal is the light signal obtained only from the high temperature area, and this signal will be referred to as a super-resolution signal. The signal from the low temperature area has a different frequency characteristic from that of the super-resolution signal and causes a random influence on this super-resolution signal in reproducing a random data sequence. Accordingly, the signal from low temperature area is an element disturbing the reproducing signal. Here, a signal generated from this low temperature area is referred to as the normal-resolution crosstalk.

This normal-resolution crosstalk can be suppressed using a method shown below, for example. Herein, a ROM disc is described as an example. In the final form of the disc, a super-resolution film is embedded only in a recording mark, which is a concave portion in the disc substrate, as described in Japanese Journal of Applied Physics, Vol. 42, pp. 1101-1104. This form is obtained by chemically mechanically polishing the disc after the deposition. Here, the complex reflectivities of a mark portion and a space portion are made equal in the design of the film stack of the disc. The mark and space have thus completely the same optical characteristic with respect to an incident laser beam. Accordingly, even if a mark is present, a signal cannot be obtained in a drive (information reproducing device) but if the optical characteristic of the mark portion changes due to a super-resolution phenomenon, a reproduction signal will be obtained. Namely, since the reproduction signal is obtained only after the super-resolution phenomenon occurs, the normal-resolution crosstalk can be suppressed consequently. This suppresses the normal-resolution crosstalk both between tracks and within a track, so that the track density can be also improved.

The method for obtaining a tracking error signal for carrying out tracking servo may be an issue in this case. For example, in a push-pull scheme, which is a currently widely used tracking method, an intensity difference (push-pull signal) in intensity between diffracted light beams generated on right and left sides of the traveling direction of a spot is detected at the edge of a track groove or a pit. If the difference is finite, then it is determined that the track center and the spot center deviate from each other, and the spot position is corrected. In this method, when the track density is increased, the diffraction efficiency will decrease, which thereby reduces the quantity of a push-pull signal described above and reduces the signal-noise ratio (SNR) of the push-pull signal. This causes a tracking error.

This problem is solved by carrying out tracking servo using a medium having normal-resolution crosstalk suppressed as described above and using a push-pull signal caused by super-resolution conditions. From the above-described medium having the suppressed normal-resolution crosstalk, a push-pull signal cannot be obtained in non-super-resolution conditions. However, if there is an optical phase difference between a mark portion and a space portion in super-resolution conditions, a push-pull signal can be obtained. Furthermore, in this case, since a push-pull signal can be obtained from only one mark, a problem of a decrease in the diffraction efficiency will not occur even if the track pitch is small.

In order to obtain a super-resolution and high-quality reproduction signal, the super-resolution area is preferably in size between the shortest mark length and the second shortest mark length. Here, the second shortest mark length represents the length of a mark having the second shortest length among digitized marks recorded on the medium. The size of the super-resolution area can be controlled through adjustment of the reproduction laser power. This is because an increase in the reproduction laser power will increase the size of a high temperature super-resolution area while a decrease in the power will reduce the size of the super-resolution area, for example. The method for adjusting the reproduction laser power is described in Japanese Patent Application Publication No. 2006-107588, for example. In this method, a mark having a predetermined pattern is recorded on a medium in advance, and this mark is reproduced by means of super-resolution, whereby the reproduction power at which the bit error rate of the reproduction signal becomes the minimum is determined.

SUMMARY OF THE INVENTION

As described above, in the medium having the suppressed normal-resolution crosstalk, tracking servo is carried out using a push-pull signal obtained from the super-resolution area. In this case, the amplitude of the obtained push-pull signal strongly depends on the size in the medium radial direction of the super-resolution area. Here, it is assumed that the track is formed spirally from the center of a circular medium as in the conventional optical disc, and that the medium radial direction means the direction substantially perpendicular to the track. However, the present invention is applicable not only to such a spiral track but a concentric circular track and the like.

For example, if the super-resolution area elongates in the medium radial direction and causes a super-resolution phenomenon also on an adjacent track, the diffraction will occur also from a mark on the adjacent track. Since a push-pull signal obtained in this case has an amplitude comparable to that of a push-pull signal obtained from a substrate having a small track pitch in an ordinary optical disc, this amplitude is insufficient for carrying out stable tracking servo.

The size in the medium radial direction of a super-resolution area is determined by the reproduction laser power, as the size in the track direction is. However, this size is not the same as the size in the track direction and depends on the thermal characteristic of the medium, the medium rotational speed, and the like. The method for adjusting the reproduction laser power described in Japanese Patent Application Publication No. 2006-107588 is effective in adjusting the size of a super-resolution area in the track direction. If the size of a super-resolution area in the medium radial direction becomes extremely large, the reproduction signal is overlapped by a signal of the adjacent track, thereby increasing the bit error rate. However, which of the quality of the track error signal and the quality of the reproduction signal depends more on the size in the medium radial direction of the super-resolution area is not definitely determined but differs depending on the medium design and the like.

For this reason, there is a need for a method for adjusting the reproduction laser power for controlling the sizes of a super-resolution area both in the track direction and in the medium radial direction at the same time, and improving the quality of both the reproduction signal and the track error signal.

The present invention can resolve the above-described problems by determining the reproduction laser power while observing a signal detected in a photo detector, after carrying out focusing servo with a laser beam focused onto a medium, and before carrying out tracking servo.

In a state where the tracking servo is not carried out, a light spot crosses a track and is present at the center of a track at a certain instant and present at the center between tracks at another instant. FIG. 2 schematically shows the relationship between the arrangement of marks and the size of a super-resolution area when a light spot is present at the center of a track or at the center between tracks. Furthermore, FIG. 1A shows the relationship between the magnitude of a reproduction laser power and the values obtained by dividing the upper level and the lower level of an envelope of a cross track signal by the reproduction laser power. Here, the cross track signal represents a changed portion in a total quantity of signals that is obtained in a photo detector when a laser beam crossed a track while the tracking servo is not carried out. Moreover, FIG. 1B shows the relationship between the reproduction laser power and the amplitude of the shortest mark in a reproduction signal obtained in carrying out the tracking servo and carrying out the super-resolution reproduction. The horizontal axis of FIGS. 1A and 1B represent the value normalized by the minimum laser power at which the super-resolution occurs. Moreover, the vertical axis represents the value normalized by the reproduction signal level in the state where the super-resolution has not occurred. The disc used here has a characteristic that when the super-resolution occurred the signal level will decrease.

The laser wavelength of a drive and the numerical aperture of an objective lens used here are 405 nm and 0.85, respectively. Moreover, the disc used here is a ROM disc that is designed and manufactured so as to suppress the above-described normal-resolution crosstalk. A time window width Tw of a recording pit is 25 nm and the modulation code used is 1-7 PP. That is, the shortest mark length is 50 nm.

From the characteristic features of FIGS. 1A and 1B, the laser power can be divided into three regions. The laser powers at boundaries of the regions are denoted by P1, P2, and P3. P1 is the minimum laser power at which the super-resolution occurs, and a signal cannot be obtained with the laser power below P1.

FIG. 2 shows the relationship between marks and a super-resolution area in the ranges of the laser power: $P1 \leq P \leq P2$, $P2 < P < P3$, and $P3 \leq P$ where P is the laser power. FIG. 2 shows a case where the center of a light spot is present at the center of a track and a case where it is present at the center between tracks. The size of the super-resolution area shown in the view increases as the laser power P increases. FIG. 2 schematically shows the size of a super-resolution area at a specific laser power value in the respective ranges of the laser power.

Note that, when the laser power P satisfies the condition $P < P1$, the super-resolution phenomenon does not occur, and further in the disc used here the normal-resolution crosstalk is suppressed, so that there is few change in the obtained signal. Namely, the upper level and the lower level of an envelope are equal.

In the laser power range of $P1 \leq P \leq P2$, the size of the super-resolution area is smaller than the size of the shortest mark. When the spot center is present at the center between tracks, the super-resolution area does not overlap with the mark, so that the upper level of the cross track signal is a signal level (i.e., 1) in the state where the super-resolution does not occur. As the reproduction power (laser power for reproduction) increases, the size of the super-resolution area will increase and the super-resolution signal will increase accordingly, so that the lower level of the cross track signal will decrease. As a result, the amplitude of the cross track signal will increase along with the reproduction power.

In the laser power range of $P2 < P < P3$, the size of the super-resolution area is larger than either one of or both of the size of the shortest mark and the size of a half the track pitch, and when the spot center is present at the center between tracks, the super-resolution will occur in the marks on the tracks on both sides thereof, while when the spot center is present at the center of a track, an inter-symbol interference will occur. This decreases the upper level of the cross track signal. The lower level of the cross track signal decreases due to the same reason as in the case of $P1 \leq P \leq P2$. Accordingly, the amplitude of the cross track signal does not depend greatly on the reproduction power.

In the laser power range of $P3 \leq P$, when the light spot center is present at the center of a track, the super-resolution area reaches further the adjacent track and the area of marks existing within the super-resolution area will increase. Accordingly, a change in the lower level of the cross track signal with respect to the reproduction power becomes more abrupt than in the case where the laser power range is $P2 < P < P3$. The upper level of the cross track signal varies similarly as in the case of $P2 < P < P3$. For this reason, the amplitude of the cross track signal will increase with respect to the reproduction power.

The critical issue in the super-resolution reproduction is obtaining a high-quality reproduction signal and a sufficient track error signal. In order to satisfy these two at the same time, the range of the laser power is desirably in the region of $P2 < P < P3$. This is because the super-resolution phenomenon occurs on a single track and the size of the super-resolution region is large and thus a large signal amplitude can be obtained. However, an inter-symbol interference will occur, so that in the laser power range of $P2 < P < P3$, the reproduction power is desirably set to the one in the range allowed by a reproduction system of the drive. Moreover, also when the tracking servo is carried out using the push-pull scheme, in the laser power range of $P2 < P < P3$ the diffraction light from the adjacent track will not occur. Accordingly, tracking servo using a push-pull signal caused by the diffraction from a single mark can be achieved.

As described above, by observing a cross track signal, it is possible to set an adequate reproduction power with which a high-quality reproduction signal and track error signal can be obtained.

Here, the reason why the boundaries of the ranges of the laser power are set to $P2 < P < P3$ instead of $P2 \leq P \leq P3$ is described. Since the state of P=P2 or P=P3 serves as a boundary that separates the ranges of the laser power, the laser power P may theoretically belong to either one of the adjacent ranges. However, there is noise on the laser power and sensitivity inhomogeneity on a disc in the drive (optical information reproducing device), so that if the range is set as $P2 \leq P \leq P3$, a signal indicating a range other than the range of $P2 \leq P \leq P3$ may be obtained although the signal is the one at P=P2 or P=P3 in a certain region. Problems resulting from this can be solved by setting the boundaries of the ranges of the laser power as $P2 < P < P3$.

In the actual drive, there are a plurality of methods for identifying the power values of P2 and P3 from the cross track signal. An example is a method for simultaneously observing the differential coefficients of the upper level and the lower level of a cross track signal with respect to the reproduction power. In the drive, the value of the initial reproduction power is set to P2 or less, and then the reproduction power is increased from this value to identify a point where the differential coefficient of the upper level becomes negative. This value is the power P2. Furthermore, the value of the reproduction power is increased to identify a point where the differential coefficient of the lower level changes. This value is the power P3.

Moreover, each of the power values P2 and P3 can also be determined by observing the differential coefficient of the amplitude of a cross track signal with respect to the reproduction power and identifying a region where this differential coefficient decreases. The above-described differential coefficient may be the one equivalent to the differential coefficient. For example, a difference between the quantities of signals obtained at two different powers divided by a difference between the two powers corresponds to this differential coefficient.

Only a cross track signal has been focused in the above-described method, however, a track error signal may be observed at the same time and from the amplitude thereof the range of the reproduction power of the track error signal may be further narrowed.

In order to reduce the influence of fluctuation of the cross track signal caused by noise on the laser, the drive, and the disc in the above-described method, the signal level used for calculating the differential coefficient may be an average of the signal levels at the respective reproduction powers. Thus, time required for capturing the signals at the respective reproduction powers may be determined depending on the disc rotational speed, the frequency of noise, or the like.

In the super-resolution scheme, heat generated inside a disc by irradiating the disc with the reproducing light is used, but if the reproduction power is high, the temperature inside the disc may increase to degrade the thin film formed on the disc. In order to avoid this, it is also possible to determine an upper limit of the reproduction power in advance in the above-described means. For that purpose, information about the reproduction power may be described in a predetermined region on the disc in advance, for example. These information may include P2, P3, and the like as the maximum allowable reproduction power values.

For the super-resolution reproduction technology that enables the reproduction of a mark smaller than the optical resolution and thereby achieves a further increase in the density and capacity of the recording data, a reproduction laser power for obtaining a high-quality reproduction signal and tracking signal can be determined.

BRIEF DESCRIPTION OF THE DRAWINGS

FIG. 1A shows a relationship between the upper level and the lower level of an envelope of a cross track signal and FIG. 1B is a view showing the amplitude of the cross track signal.

DESCRIPTION OF THE PREFERRED EMBODIMENTS

As a first embodiment, a case where the upper and lower levels of an envelope of a cross track signal are observed is described.

Figure 1A:
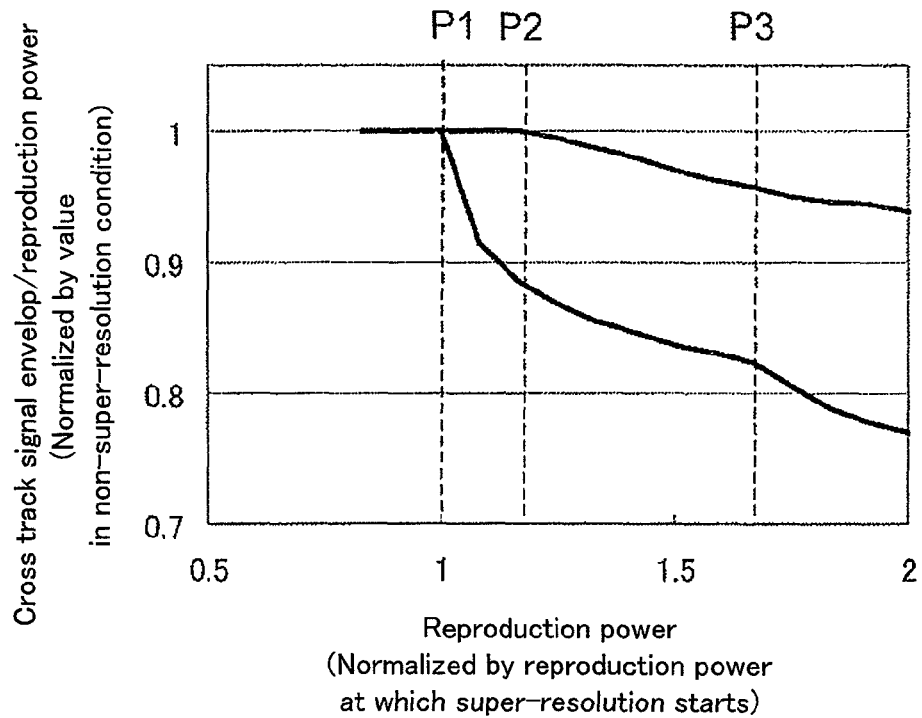
FIGS. 1A and 1B show a relationship between a reproduction laser power and a cross track signal, where
Figure 1B:
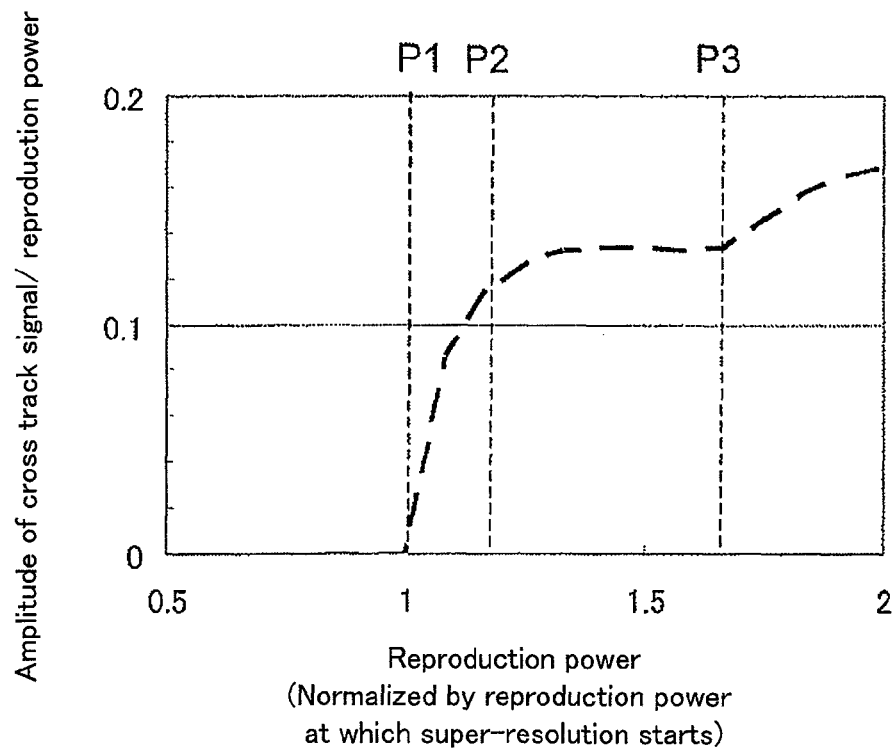
Figure 2:
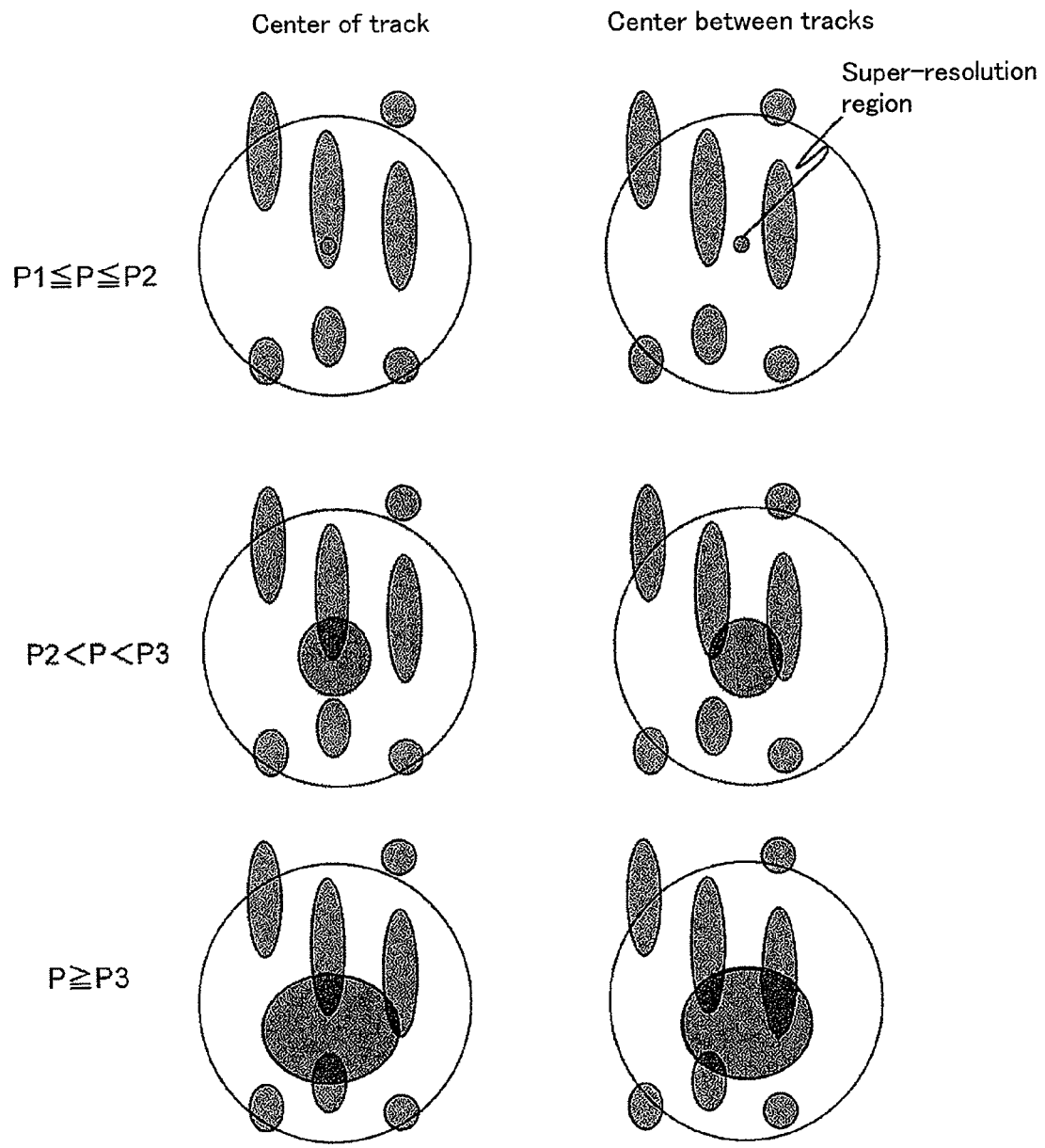
FIG. 2 shows a conceptual diagram of a relationship among marks, a light spot, and the size of a super-resolution region in each reproduction power region of FIG. 1.

First, a method for fabricating a disc is described hereinafter. Here, the case of a ROM disc is described. In order to fabricate the ROM disc, data is recorded using an electron beam lithography apparatus. An electron beam resist is applied in a thickness of 100 nm onto a silicon substrate. A pattern corresponding to a recording data is drawn with an electron beam while rotating the substrate. The modulation code used here is 1-7 PP with a time window width of 25 nm, and the shortest mark length is 50 nm. The mark width is set to 100 nm and the track pitch is set to 200 nm. The recording data includes the values of P2 and P3 shown in FIGS. 1A and 1B. This data is recorded in regions of 24 mm and 58 mm radially from the center of the disc. Furthermore, in the disc radius from 25 mm to 25.5 mm and the disc radius from 57.5 mm to 58 mm, a predetermined data sequence is recorded.

The substrate after the drawing is developed and the resist in a portion irradiated with an electron beam is removed. Then, the silicon is etched using reactive ion etching. Thus, a pit is formed in a portion where the resist is removed, i.e., only in the portion irradiated with the electron beam. The time for the reactive ion etching is controlled to set the depth of the pit to 50 nm. Then, the resist remaining on the substrate is dissolved.

A replica of this substrate is fabricated by Ni plating. This is used as a stamper, and melted polycarbonate is poured into the stamper and then the polycarbonate is cooled and hardened to fabricate a polycarbonate substrate in which pits corresponding to the recording data are formed.

$Al_2O_3$, GeSbTe, and GeN are deposited above this polycarbonate substrate by sputtering. GeSbTe and $Cr_2O_3$ in a space portion of the disc are polished to leave $Al_2O_3$, GeSbTe, and GeN inside a pit and leave only $Al_2O_3$ inside the space portion. The polished area is in the disc radius from 25 mm to 57 mm. Then, GeN is deposited by sputtering. A polycarbonate sheet with a thickness of 0.1 mm is stuck onto this surface.

In the above-described disc, in a state where super-resolution does not occur, the reflectivity and optical phase with respect to light having a wavelength of 405 nm are made the same both in a space and in a pit. This is achieved by calculating the reflectivity and optical phase taking into account the optical interference in advance and determining the film thickness of the thin film.

Figure 3:
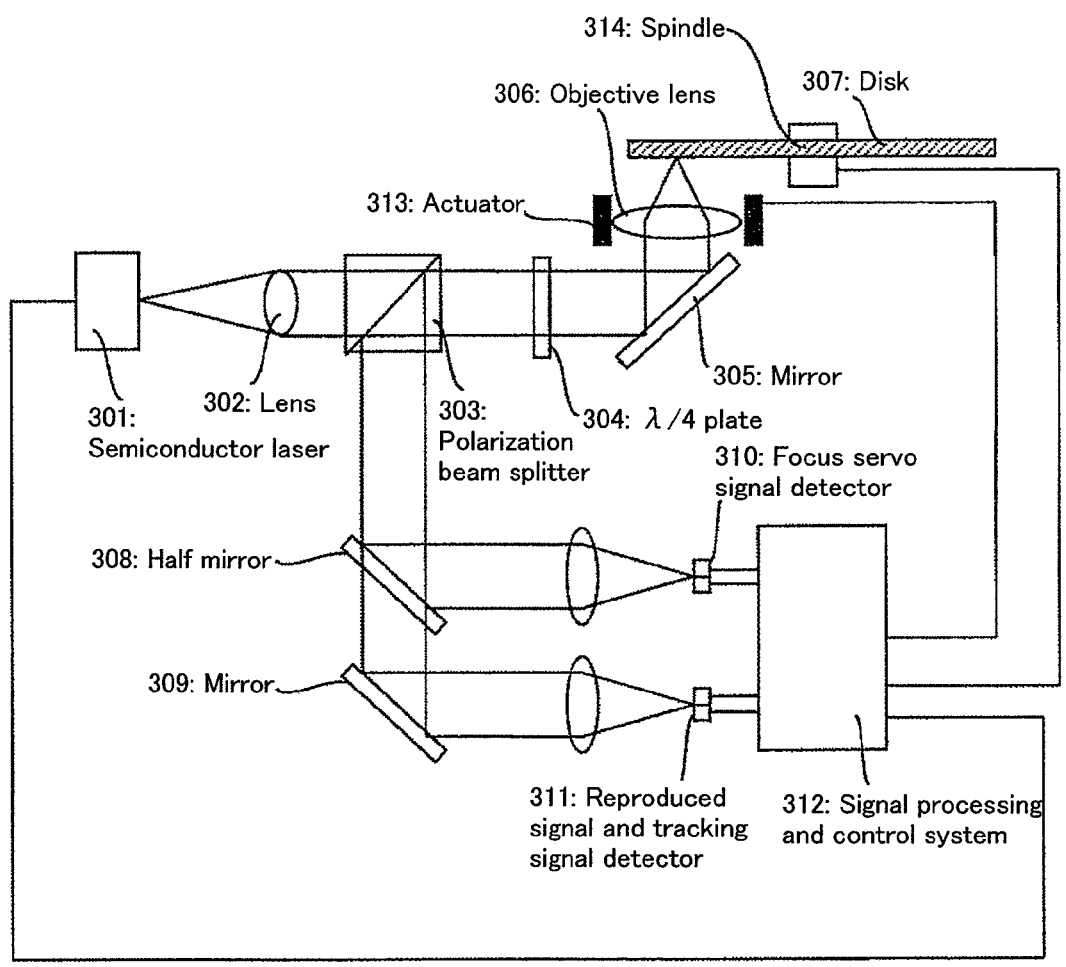
FIG. 3 is a view illustrating the structure of an optical disc drive used for verification of the effects of the present invention.

This disc is reproduced using a drive having a configuration shown in FIG. 3. A laser beam emitted from a semiconductor laser 301 is transformed into a parallel light through a lens 302. This parallel light transmits through a polarization beam splitter 303. At this time, while the laser beam emitted from the semiconductor laser 301 is a linearly polarized light, the orientation of the polarization beam splitter 303 is adjusted in advance so as to be in such polarization direction that the laser beam may completely transmit through the polarization beam splitter 303. The laser beam is converted into a circularly polarized light through a λ/4 plate 304, and is focused through a mirror 305 and an objective lens 306 onto a disc 307 that is rotating via a spindle 314. The reflected light from the disc is transformed through the objective lens 306 and the mirror 305 into a linearly polarized light through the λ/4 plate 304. The direction of the linearly polarized light differs by 90° from the polarization direction when emitted from the semiconductor laser 301. Accordingly, upon incidence of this light onto the polarization beam splitter 303, the optical path is bent by 90°. This light is split into two by a half mirror 308, and one of them is incident on a focus servo signal detector 310 and the other one is incident on a reproduction signal and tracking signal detector 311 after the optical path thereof is bent by a mirror 309. The output signals from the both detectors are inputted to a signal processing and control system 312. This signal processing and control system 312 processes an auto-focusing servo signal and tracking servo signal sent from the detectors 310, 311, and sends to an actuator 313 a signal for correcting the position of the lens. In this drive, portions other than the signal processing and control system 312 may be the same as the configuration of the conventional drive. A mechanism to determine the reproduction power is mounted on the signal processing and control system 312. The wavelength of the laser in this drive is set to 405 nm and the numerical aperture of the objective lens is set to 0.85.

The disc is mounted on the drive, the disc is rotated at a linear velocity of 5 m/s, the disc is irradiated with a laser having a power of 0.5 mW, focusing servo is applied to move the light spot to a position of 24 mm radially from the center of the disc and to read the values of P2 and P3 recorded on this area. The values of P2 and P3 are 2.4 mW and 2.8 mW, respectively.

Next, the light spot is moved to a position for reproducing the data. Then, the reproduction power is varied from 2.2 mW to 3.0 mW by a step increment of 0.05 mW in a state where the tracking servo is not applied. A total quantity of signals is acquired on the detector for 100 μs at the respective reproduction powers. This corresponds to the cross track signal. Here, the signal is acquired once every 2.5 ns. That is, signals at 40000 points are acquired at one reproduction power. From these 40000-point data, an envelope of the signal is calculated. This corresponds to the upper level and the lower level. The respective average values of the upper level and the lower level are calculated. These are the upper level and the lower level of the reproduction power. Next, let the upper levels at a reproduction power Pn and the next higher reproduction power Pn+0.05 mW be denoted by Vu (n) and Vu (n+1), respectively, and {Vu(n+1)−Vu (n)}/0.05 is calculated. The same calculation is performed also for the lower level. Here, this is defined as the differential coefficient of each signal.

When the reproduction power dependences of the differential coefficients of the upper level and the lower level are observed in the above-described range of the reproduction power, the differential coefficient of the upper level is substantially zero at no more than 2.3 mW, but at greater than 2.3 mW it showed a negative value and this value was hardly changed with the reproduction power. Moreover, although all of the differential coefficients of the lower level are negative values, they showed an almost constant value at no less than 2.35 mW and changed again at no less than 2.75 mW.

Thus, it is determined that P2 is near 2.3 mW and P3 is near 2.75 mW. The reproduction power is set to 2.3 mW, and the light spot is moved to a position of 25.3 mm radially from the disc center to apply the tracking servo. Next, the predetermined data sequence is reproduced while increasing the reproduction power by a step increment of 0.05 mW in the range from 2.3 mW to 2.75 mW, and this reproduction error rate (bit error rate) is measured, and a reproduction power at which the bit error rate becomes the minimum is determined as the optimum reproduction power of this disc.

Next, a second embodiment is described. Here, a means for observing the amplitude of a cross track signal is described.

The disc is fabricated using the same method as the first embodiment. Moreover, the configuration of the drive is the same as the first embodiment except the signal processing and control system 312 of FIG. 3.

The disc is rotated inside the drive as in the first embodiment, and the data regarding the values of P2 and P3 recorded on the disc is read and then the light spot is moved to a portion in which the predefined data sequence is recorded.

The cross track signal is acquired as in the first embodiment, and the amplitude thereof is calculated in the signal processing and control system 312. As in the first embodiment, the differential coefficient of the amplitude of the cross track signal when the reproduction power is increased from 2.0 mW to 3 mW by a step increment of 0.05 mW is calculated. Here, as in the first embodiment, let the amplitudes at the reproduction power Pn and the next reproduction power Pn+0.05 mW be denoted by dV (n) and dV (n+1), respectively, then the differential coefficient is determined by calculating {dV(n+1)−dV(n)}/0.05. All the values of the differential coefficients described above are normalized with a signal level Vu of the upper level of the cross track signal at the reproduction power of 2.2 mW.

In the data sequence related to the above-described normalized differential coefficient and the reproduction power, a reproduction power region in which the normalized differential coefficient becomes equal to or less than a desired value is identified in advance. This desired value dVth is set to 0.04. This is because in FIG. 1B the normalized differential coefficients in the regions of P1<P<P2 and P3≦P are 0.09 and 0.055, respectively, and thus a region, in which the normalized differential coefficient becomes smaller than this value, is intended to be identified. dVth is set to 0.04 taking into account the noise or measurement error. The minimum and maximum reproduction powers in this region are 2.4 mW and 2.8 mW, respectively.

After this, as in the first embodiment, the tracking servo is applied, and the reproduction power is increased by a step increment of 0.05 mW in the range from 2.5 mW to 2.75 mW to measure a relationship between the bit error rate and the reproduction power for a predefined data sequence, and a reproduction power at which the bit error rate becomes the minimum is determined as the optimum reproduction power.

Subsequently, a third embodiment is described. A method for calculating a second differential coefficient from the differential coefficient of the amplitude of a cross track signal obtained in the second embodiment is described.

Up to the step of calculating a differential coefficient of the amplitude of a cross track signal in the second embodiment, the operations are the same in the third embodiment. This differential coefficient is further differentiated. Namely, let the n-th differential coefficient be dV (n) and let the differential coefficient for the power, which is larger by one step than the power corresponding to dV(n), be dV(n+1), then {dV(n+1)−dV(n)}/0.05 is calculated. From this, the calculated second differential coefficient showed values which are quite different from zero at the points where the differential coefficient varies, i.e., near P2 and near P3 in FIG. 1B, so that P1, P2, and P3 could be identified. Precisely speaking, this reproduction power which is quite different from zero has a spread, so that the reproduction power showing a value furthest from zero are regarded as P2 and P3. Thus, P2 and P3 are determined as 2.35 mW and 2.75 mW.

Then, a fourth embodiment is described. Here, a case where detection of a push-pull signal is used in addition to the calculation of the second differential coefficient in the third embodiment is described.

In the process of detecting a cross track signal while increasing the reproduction power in order to identify P2 and P3 in the third embodiment, the push-pull signal is detected at the same time. The push-pull signal described here is a value normalized by a total quantity of signals. In the drive used here, it is known that if the amplitude of the push-pull signal is greater than 1.5 V, the tracking servo is sufficiently stabilized, but the reproduction power at which the amplitude of the push-pull signal becomes greater than 1.5V is in the range from 2.45 mW to 2.7 mW.

The tracking servo is applied at 2.45 mW, and the reproduction power is increased up to 2.7 mW by a step increment of 0.05 mW, and when the bit error rate of a mark sequence having a predetermined pattern is measured, the bit error rate becomes the minimum at 2.65 mW. Thus, the optimum reproduction power is determined as 2.65 mW.

Furthermore, a fifth embodiment is described. Here, the optimum reproduction power for a disc having other structure is determined using the method described in the fourth embodiment.

The method for fabricating this disc is the same as the method described in the first embodiment. Although the thin film material is also the same, the film thickness thereof is changed. As a result, it is verified that cancellation of the normal-resolution crosstalk is achieved on the medium.

In the method of the fourth embodiment, the reproduction power at which the amplitude of the push-pull signal becomes equal to or greater than 1.5 V is in the range from 2.35 mW to 2.5 mW, and the amplitude at 2.65 mW is 0.63 V. When the tracking servo is applied at the reproduction power of 2.35 mW and the bit error rate is measured while increasing the reproduction power up to 2.7 mW, the reproduction power at which the bit error rate becomes the minimum is 2.65 mW and the value thereof is $1.2 \times 10^{-6}$.

Although the tracking servo works at 2.65 mW, the margin for practical use is insufficient. The bit error rate and the amplitude of the push-pull signal at the reproduction power of 2.5 mW are $5 \times 10^{-5}$ and 0.72 V, and $1 \times 10^{-5}$ and 0.69 V at 2.55 mW. Since the bit error rate for practical use is $1 \times 10^{-5}$, the reproduction power is set to 2.55 mW here. Since the amplitude of the push-pull signal is equal to or less than 1.5 V but is close to 1.5 V, there seems no problem in particular. However, a mechanism for displaying a warning is provided in the drive so that a user may know the condition of the disc.

Moreover, a sixth embodiment is described below. Here, a case is described, in which the method described in the fourth embodiment is applied to the disc having the structure described in Japanese Journal of Applied Physics, Vol. 32, pp. 5210-5213.

The one described in Japanese Journal of Applied Physics, Vol. 32, pp. 5210-5213 is a structure, in which a super-resolution thin film, a protection film, and a reflection film are just sputtered onto a ROM disc substrate, and the cancellation of the normal-resolution crosstalk is not considered.

Although the disc substrate is fabricated using the method described in the first embodiment, a 1-7 PP modulation code with a time window width of 50 nm is used. Here, the shortest mark length is 100 nm. Moreover, the track pitch is set to 320 nm.

Ag alloy, $Al_2O_3$, GeSbTe, and $Al_2O_3$ are deposited onto this substrate by sputtering. A polycarbonate sheet of 0.1 mm thickness is stuck onto this sample.

The same drive as the one used in the fourth embodiment is used.

As a result, from the second differential coefficient of a cross track signal, P2 and P3 are identified as 2.8 mW and 3.15 mW. Moreover, the reproduction power at which the amplitude of the push-pull signal is equal to or greater than 1.5 V is in the range from 2.6 mW to 3.4 mW. When the bit error rate is measured with the reproduction power in the range from 2.8 mW to 3.15 mW, the bit error rate becomes the minimum at 3.05 mW. Accordingly, the method of the present invention is found to be effective also to a disc that is fabricated without considering the cancellation of the normal-resolution crosstalk.

What is claimed is:

1. An optical information reproducing method for irradiating light to an optical information recording medium and thus reproducing information from the optical information recording medium, the method comprising:
   in the case where the optical information recording medium contains a material, an optical characteristic of which changes with irradiated light and returns to an optical characteristic before the light irradiation when the irradiated light power is reduced,
   a step of performing a focusing servo function and thus causing a light spot to track a recording surface of the optical information recording medium; and
   a step of detecting a detection signal including reflected light of the irradiation light as a cross track signal with a photo detector, without performing a tracking servo function, and extracting a change-point of an upper envelope of the cross track signal and a change-point of a lower envelope of the cross track signal, and determining an optimum reproduction power by varying reproduction power between the change-point of the upper envelope and the change-point of the lower envelope.

2. The optical information reproducing method according to claim 1, wherein a range of an optimum light power is determined using either at least one of an absolute value or relative value of the detection signal, or a first differential coefficient or second differential coefficient of the detection signal with respect to an irradiation light power.

3. The optical information reproducing method according to claim 1, further comprising:
   a step of detecting both the detection signal and a tracking error signal;
   wherein a range of an optimum light power is identified in each of the detection signal and the tracking error signal, to thereby determine an overlap between both ranges as a determined range of an optimum light power.

4. The optical information reproducing method according to claim 1, wherein an average of signals obtained during irradiation at a constant irradiation light power is used as the detection signal.

5. An optical information reproducing device that reproduces information from an optical information recording medium, the device comprising:
   an optical system that emits light to the optical information recording medium and that processes reflected light;
   a focus servo signal detector that detects a first detection signal including a focus servo signal from the reflected light via the optical system;
   a tracking servo signal detector that detects a second detection signal including a tracking servo signal from the reflected light via the optical system; and
   a signal processing and control system that processes the first detection signal from the focus servo signal detector and the second detection signal from the tracking servo signal detector,
   wherein in the case where the optical information recording medium contains a material, an optical characteristic of which changes with irradiation light and returns to an optical characteristic before the light irradiation when the irradiation light power is reduced, the signal processing and control system includes:

a tracking means for causing, based on an output signal of the focus servo signal detector, a light spot to track a recording surface of the optical information recording medium;

a detecting means for detecting a reflected light of the irradiation light as a cross track signal with a photo detector, without performing a tracking servo function, and extracting a change-point of an upper envelope of the cross track signal and a change-point of a lower envelope of the cross track signal; and a determination means for determining an optimum reproduction power by varying reproduction power between the change-point of the upper envelope and the change-point of the lower envelope.

6. The optical information reproducing device according to claim 5, wherein an observation means observes an observation result including at least one of an absolute value or a relative value of the cross track signal, or a first differential coefficient or a second differential coefficient of the cross track signal with respect to an irradiation light power; and wherein the determination means determines a range of an optimum light power using the observation result.

7. The optical information reproducing device according to claim 5, wherein the signal processing and control system further detects a tracking error signal from an output signal from the tracking signal detector; and wherein the signal processing and control system further identifies a range of an optimum light power in each of the cross track signal and in the tracking error signal, to thereby determine an overlap between the ranges as a determined range of an optimum light power.

8. The optical information reproducing device according to claim 5, wherein an average of signals obtained during irradiation at a constant irradiation light power is used as at least one of the first and second detection signals.

9. An optical information reproducing device configured to reproduce information from an optical information recording medium, the device comprising:

an optical unit configured to emit light to the optical information recording medium and configured to process the reflected light;

a focus servo signal detector configured to detect a first detection signal including a focus servo signal from the reflected light via the optical unit;

a tracking servo signal detector configured to detect a second detection signal including a tracking servo signal from the reflected light via the optical unit; and a signal processing and control unit configured to process the first detection signal from the focus servo signal detector and the second detection signal from the tracking servo signal detector, wherein in the case where the optical information recording medium contains a material, an optical characteristic of which changes with irradiation light and returns to an optical characteristic before the light irradiation when the irradiation light power is reduced, the signal processing and control unit is configured to:

cause, based on an output signal of the focus servo signal detector, a light spot to track a recording surface of the optical information recording medium;

detect a reflected light of the irradiation light as a cross track signal with a photo detector, without performing a tracking servo function, and extract a change-point of an upper envelope of the cross track signal and a change-point of a lower envelope of the cross track signal; and determine an optimum reproduction power by varying reproduction power between the change-point of the upper envelope and the change-point of the lower envelope.

10. The optical information reproducing device according to claim 9, wherein an observation means observes an observation result including at least one of an absolute value of at least one of the first and second detection signals, a relative value of at least one of the first and second detection signals, a first differential coefficient of at least one of the first and second detection signals with respect to an irradiation light power, and a second differential coefficient of at least one of the first and second detection signals with respect to an irradiation light power; and wherein the determination means determines a range of an optimum light power using the observation result.

11. The optical information reproducing device according to claim 9, wherein the signal processing and control unit further detects a tracking error signal from an output signal from the tracking signal detector, and detects at least one of the first and second detection signals of the reflected light of the irradiation light, and also the tracking error signal in the photo detector; and wherein the signal processing and control unit further identifies a range of an optimum light power in at least one of the first and second detection signals, and also the tracking error signal, to thereby determine an overlap between the ranges as the range of an optimum light power.

12. The optical information reproducing device according to claim 9, wherein an average of signals obtained during irradiation at a constant irradiation light power is used as at least one of the first and second detection signals.

* * * * *